(12) United States Patent
Fitzgerald et al.

(10) Patent No.: US 6,269,477 B1
(45) Date of Patent: *Jul. 31, 2001

(54) METHOD AND SYSTEM FOR IMPROVING THE LAYOUT OF A PROGRAM IMAGE USING CLUSTERING

(75) Inventors: Robert P. Fitzgerald, Redmond; John W. Miller, Kirkland; John R. Douceur, Bellevue, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,030

(22) Filed: Sep. 16, 1997

(51) Int. Cl.[7] ......................................................... G06F 9/45
(52) U.S. Cl. ....................................... 717/4; 717/9; 717/11
(58) Field of Search .................................. 395/704; 717/4, 717/9, 11

(56) References Cited

U.S. PATENT DOCUMENTS

| 4,730,259 | * | 3/1988 | Gallant ..................................... 706/16 |
| 5,212,794 | * | 5/1993 | Pettis et al. ............................... 717/9 |
| 5,465,258 | * | 11/1995 | Adams ..................................... 395/704 |
| 5,579,520 | * | 11/1996 | Bennett ..................................... 717/4 |
| 5,664,191 | * | 9/1997 | Davidson et al. ................... 709/100 |
| 5,734,908 | * | 3/1998 | Chan et al. ............................... 717/9 |
| 5,768,592 | * | 6/1998 | Chang ..................................... 395/704 |
| 5,790,822 | * | 8/1998 | Sheaffer et al. ........................ 712/204 |
| 5,790,858 | * | 8/1998 | Vogel ..................................... 395/704 |
| 5,889,999 | * | 3/1999 | Breternitz, Jr. et al. ................... 717/9 |
| 5,940,622 | * | 8/1999 | Patel ..................................... 717/9 |
| 5,950,009 | * | 9/1999 | Bortnikov et al. ........................ 717/9 |
| 5,999,737 | * | 12/1999 | Srivastava ................................. 717/9 |
| 6,006,033 | * | 12/1999 | Heisch ..................................... 717/9 |

* cited by examiner

*Primary Examiner*—Mark Powell
*Assistant Examiner*—Chameli Chaudhuri Das
(74) *Attorney, Agent, or Firm*—Merchant & Gould P.C.

(57) ABSTRACT

A computer system for establishing a program image layout of a computer program. The computer program has basic blocks that each have temporal usage vector indicating time intervals during which the basic block was accessed during an execution of the computer program. For each of the basic blocks, the layout system initializes a cluster to contain that basic block and the layout system repeats the following until one cluster remains that contains all of the basic blocks. For each possible ordered pair of clusters, the layout system determines a metric value for the ordered pair of clusters, the metric value being derived from the temporal usage vectors of the basic blocks of the cluster and estimating an effect on the performance of the computer program when that ordered pair of clusters are position in the program image in that order and contiguously. The layout system then selects the ordered pair whose metric value estimates the smallest effect on the performance of the computer program. The layout system then replaces the clusters of the selected ordered pair of clusters with a new cluster that includes the basic blocks of the selected order pair.

19 Claims, 14 Drawing Sheets

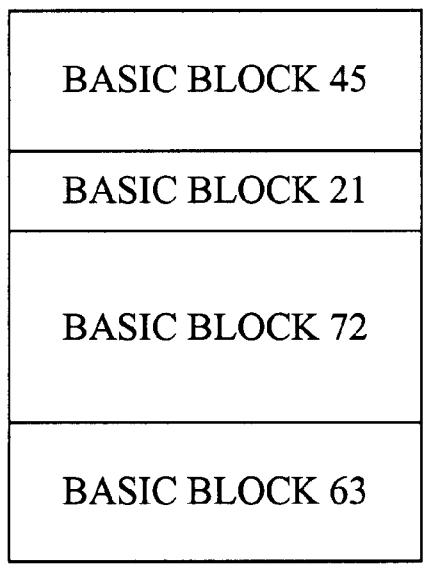 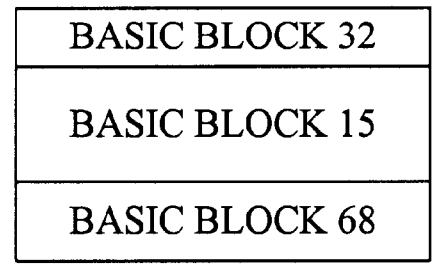
Fig. 3A
| basic block | Temporal Usage Vector | size |
|---|---|---|
| 15 | 000111000100100 | 18 |
| 21 | 111100001001010 | 12 |
| 32 | 000110000100001 | 7 |
| 45 | 101100000010011 | 22 |
| 63 | 110110001011010 | 21 |
| 68 | 000111011001100 | 11 |
| 72 | 110110001001010 | 25 |
Fig. 3B

|   | 0 | 1 | 2 | 3 | 4 | 5 | 6 | 7 |
|---|---|---|---|---|---|---|---|---|
| 0 | ∞ | 50 | 63 | 89 | 59 | 47 | 85 | 65 |
| 1 | 70 | ∞ | 53 | 90 | 45 | 35 | 52 | 60 |
| 2 | 65 | 46 | ∞ | 80 | 44 | 32 | 65 | 73 |
| 3 | 87 | 68 | 75 | ∞ | 63 | 51 | 83 | 72 |
| 4 | 61 | 36 | 51 | 72 | ∞ | 39 | 69 | 64 |
| 5 | 55 | 44 | 37 | 62 | 40 | ∞ | 67 | 49 |
| 6 | 77 | 52 | 60 | 85 | 61 | 58 | ∞ | 70 |
| 7 | 68 | 46 | 58 | 75 | 59 | 45 | 75 | ∞ |

*Fig. 4A*

|   | 0 | 1 | 2 | 3 | 4 | 5 | 6 |
|---|---|---|---|---|---|---|---|
| 0 | ∞ | 50 | 63 | 89 | 59 | 65 | 85 |
| 1 | 70 | ∞ | 53 | 90 | 45 | 60 | 52 |
| 2 | 65 | 46 | ∞ | 80 | 44 | 73 | 65 |
| 3 | 87 | 68 | 75 | ∞ | 63 | 72 | 83 |
| 4 | 61 | 36 | 51 | 72 | ∞ | 64 | 69 |
| 5 | 68 | 46 | 58 | 75 | 59 | ∞ | 75 |
| 6 | 77 | 52 | 60 | 85 | 61 | 70 | ∞ |

*Fig. 4B*

|   | 0 | 1 | 2 | 3 | 4 | 5 | 6 |
|---|---|---|---|---|---|---|---|
| 0 | ∞ | 50 | 46 | 89 | 59 | 65 | 85 |
| 1 | 70 | ∞ | 53 | 90 | 45 | 60 | 52 |
| 2 | 65 | 48 | ∞ | 80 | 51 | 42 | 65 |
| 3 | 87 | 68 | 75 | ∞ | 63 | 72 | 83 |
| 4 | 61 | 36 | 53 | 72 | ∞ | 64 | 69 |
| 5 | 68 | 46 | 58 | 75 | 59 | ∞ | 75 |
| 6 | 77 | 52 | 63 | 85 | 61 | 70 | ∞ |

*Fig. 4C*

|   | 0 | 1 | 2 | 3 | 4 | 5 | 6 | 7 |   |
|---|---|---|---|---|---|---|---|---|---|
| 0 | ∞ | 50 | 63 | 89 | 59 | 47 | 85 | 65 | 47 |
| 1 | 70 | ∞ | 53 | 90 | 45 | 35 | 52 | 60 | 35 |
| 2 | 65 | 46 | ∞ | 80 | 44 | 32 | 65 | 73 | 32 |
| 3 | 87 | 68 | 75 | ∞ | 63 | 51 | 83 | 72 | 51 |
| 4 | 61 | 36 | 51 | 72 | ∞ | 39 | 69 | 64 | 36 |
| 5 | 55 | 44 | 37 | 62 | 40 | ∞ | 67 | 49 | 37 |
| 6 | 77 | 52 | 60 | 85 | 61 | 58 | ∞ | 70 | 52 |
| 7 | 68 | 46 | 58 | 75 | 59 | 45 | 75 | ∞ | 45 |

*Fig. 5A*

|   | 0 | 1 | 2 | 3 | 4 | 5 | 6 |   |
|---|---|---|---|---|---|---|---|---|
| 0 | ∞ | 50 | 46 | 89 | 59 | 65 | 85 | 46 |
| 1 | 70 | ∞ | 53 | 90 | 45 | 60 | 52 | 35 |
| 2 | 65 | 48 | ∞ | 80 | 51 | 42 | 65 | 42 |
| 3 | 87 | 68 | 75 | ∞ | 63 | 72 | 83 | 51 |
| 4 | 61 | 36 | 53 | 72 | ∞ | 64 | 69 | 36 |
| 5 | 68 | 46 | 58 | 75 | 59 | ∞ | 75 | 45 |
| 6 | 77 | 52 | 63 | 85 | 61 | 70 | ∞ | 52 |

*Fig. 5B*

|   | 0 | 1 | 2 | 3 | 4 | 5 | 6 |   |
|---|---|---|---|---|---|---|---|---|
| 0 | ∞ | 50 | 46 | 89 | 59 | 65 | 85 | 46 |
| 1 | 70 | ∞ | 53 | 90 | 45 | 60 | 52 | 45 |
| 2 | 65 | 48 | ∞ | 80 | 51 | 42 | 65 | 42 |
| 3 | 87 | 68 | 75 | ∞ | 63 | 72 | 83 | 51 |
| 4 | 61 | 36 | 53 | 72 | ∞ | 64 | 69 | 36 |
| 5 | 68 | 46 | 58 | 75 | 59 | ∞ | 75 | 45 |
| 6 | 77 | 52 | 63 | 85 | 61 | 70 | ∞ | 52 |

*Fig. 5C*

|   | 0 | 1 | 2 | 3 | 4 | 5 | 6 | 7 | hint | size | update list |
|---|---|---|---|---|---|---|---|---|---|---|---|
| 0 | ∞ | 50 | 63 | ∞ | 59 | 47 | ∞ | 65 | 46 | 8 | <2,46,5> |
| 1 | ∞ | ∞ | ∞ | ∞ | ∞ | 35 | ∞ | ∞ | 35 | 8 | <2,∞,5> |
| 2 | ∞ | 48 | ∞ | ∞ | 51 | 42 | ∞ | ∞ | 42 | 7 | |
| 3 | 87 | 68 | 75 | ∞ | 63 | 51 | 83 | 72 | 51 | 8 | <2,75,5> |
| 4 | ∞ | 36 | ∞ | ∞ | ∞ | 39 | ∞ | ∞ | 36 | 8 | <2,∞,5> |
| 5 | ∞ | 46 | ∞ | ∞ | 59 | ∞ | ∞ | ∞ | 45 | 7 | |
| 6 | 77 | 52 | 60 | ∞ | 61 | 58 | ∞ | 70 | 52 | 8 | <2,63,5> |

*Fig. 7A*

|   | 0 | 1 | 2 | 3 | 4 | 5 | 6 | 7 | hint | size | update list |
|---|---|---|---|---|---|---|---|---|---|---|---|
| 0 | ∞ | 50 | 63 | ∞ | 59 | 47 | ∞ | 65 | 46 | 8 | <2,46,5> |
| 1 | ∞ | ∞ | ∞ | ∞ | ∞ | ∞ | ∞ | ∞ | ∞ | 7 | |
| 2 | ∞ | 48 | ∞ | ∞ | 51 | 42 | ∞ | ∞ | 42 | 7 | |
| 3 | 87 | 68 | 75 | ∞ | 63 | 51 | 83 | 72 | 51 | 8 | <2,75,5> |
| 4 | ∞ | 36 | ∞ | ∞ | ∞ | ∞ | ∞ | ∞ | 36 | 7 | |
| 5 | ∞ | 46 | ∞ | ∞ | 59 | ∞ | ∞ | ∞ | 45 | 7 | |
| 6 | 77 | 52 | 60 | ∞ | 61 | 58 | ∞ | 70 | 52 | 8 | <2,63,5> |

*Fig. 7B*

METHOD AND SYSTEM FOR IMPROVING THE LAYOUT OF A PROGRAM IMAGE USING CLUSTERING

RELATED APPLICATIONS

This patent application is related to U.S. patent application Ser. No. 08/931,151 entitled, "Method and System for Incrementally Improving a Program Layout" and U.S. patent application Ser. No. 08/931,861 entitled, "Method and System for Controlling the Improving of a Program Layout," which are being filed concurrently and are hereby incorporated by reference.

TECHNICAL FIELD

This invention relates to a method and system for optimizing a computer program image and, more particularly, to a method and system for rearranging code portions of the program image to reduce the working set.

BACKGROUND OF THE INVENTION

Many conventional computer systems utilize virtual memory. Virtual memory provides a logical address space that is typically larger than the corresponding physical address space of the computer system. One of the primary benefits of using virtual memory is that it facilitates the execution of a program without the need for all of the program to be resident in main memory during execution. Rather, certain portions of the program may reside in secondary memory for part of the execution of the program. A common technique for implementing virtual memory is paging; a less popular technique is segmentation. Because most conventional computer systems utilize paging instead of segmentation, the following discussion refers to a paging system, but these techniques can be applied to segmentation systems or systems employing paging and segmentation as well.

When paging is used, the logical address space is divided into a number of fixed-size blocks, known as pages. The physical address space is divided into like-sized blocks, known as page frames. A paging mechanism maps the pages from the logical address space, for example, secondary memory, into the page frames of the physical address space, for example, main memory. When the computer system attempts to reference an address on a page that is not present in main memory, a page fault occurs. After a page fault occurs, the operating system copies the page into main memory from secondary memory and then restarts the instruction that caused the fault.

One paging model that is commonly used to evaluate the performance of paging is the working set model. At any instance in time, t, there exists a working set, w(k, t), consisting of all the pages used by the k most recent memory references. The operating system monitors the working set of each process and allocates each process enough page frames to contain the process' working set. If the working set is larger than the number of allocated page frames, the system will be prone to thrashing. Thrashing refers to very high paging activity in which pages are regularly being swapped from secondary memory into the pages frames allocated to a process. This behavior has a very high time and computational overhead. It is therefore desirable to reduce the size of (i.e., the number of pages in) a program's working set to lessen the likelihood of thrashing and significantly improve system performance.

A programmer typically writes source code without any concern for how the code will be divided into pages when it is executed. Similarly, a compiler program translates the source code into relocatable machine instructions and stores the instructions as object code in the order in which the compiler encounters the instructions in the source code. The object code therefore reflects the lack of concern for the placement order by the programmer. A linker program then merges related object code together to produce executable code. Again, the linker program has no knowledge or concern for the working set of the resultant executable code. The linker program merely orders the instructions within the executable code in the order in which the instructions are encountered in the object code. The computer program and linker program do not have the information required to make a placement of code within an executable module to reduce the working set. The information required can in general only be obtained by actually executing the executable module and observing its usage. Clearly this cannot be done before the executable module has been created. The executable module initially created by the compiler and linker thus is laid out without regard to any usage pattern.

As each portion of code is executed, the page in which it resides must be in physical memory. Other code portions residing on the same page will also be in memory, even if they may not be executed in temporal proximity. The result is a collection of pages in memory with some required code portions and some unrequired code portions. To the extent that unrequired code portions are loaded into memory, valuable memory space may be wasted, and the total number of pages loaded into memory may be much larger than necessary.

To make a determination as to which code portions are "required" and which code portions are "unrequired," a developer needs execution information for each code portion, such as when the code portion is accessed during execution of the computer program. A common method for gathering such execution information includes adding instrumentation code to every basic block of a program image. A basic block is a portion of code such that if one instruction of the basic block is executed then every instruction is also executed. The execution of the computer program is divided into a series of time intervals (e.g., 500 milliseconds). Each time a basic block is executed during execution of the computer program, the instrumentation code causes a flag to be set for that basic block for the current time interval. Thus, after execution of the computer program, each basic block will have a temporal usage vector ("usage vector") associated with it. The usage vector for a basic block has, for each time interval, a bit that indicates whether that basic block was executed during that time interval. The usage vectors therefore reflect the temporal usage pattern of the basic blocks.

After the temporal usage patterns have been measured, a paging optimizer can rearrange the basic blocks to minimize the working set. In particular, basic blocks with similar temporal usage patterns can be stored on the same page. Thus, when a page is loaded into main memory, it contains basic blocks that are likely to be required.

The minimization of the working set is an NP-complete problem, that is, no polynomial-time algorithm is known for solving the problem. Thus, the time needed to minimize the working set of a program image generally increases exponentially as the number of code portions increase (i.e., $O(e^n)$, where n is the number of code portions). Because complex program images can have thousands, and even hundreds of thousands, of code portions, such an algorithm cannot generate a minimum working set in a timely manner even when the most powerful computers are employed. Because the use of such algorithms are impractical for all but the smallest program images, various algorithms are needed to generate a layout that results in an improved working set (albeit not necessarily the minimal working set) in a timely manner.

SUMMARY OF THE INVENTION

The present invention provides a computer-based layout system for establishing a program image layout of a computer program. The computer program comprises code portions that each have a temporal usage pattern indicating time intervals during which the code portion is required to be loaded into memory for access. The layout system repeatedly establishes the order of pairs of code portions until the order of all the code portions is established.

The layout system first selects an ordered pair of code portions which is estimated to have the smallest effect on the performance of the computer program taking into considerations all other code portions whose ordering has already been established relative to the selected ordered pair of code portions when the code portions of the selected ordered pair are positioned both in that order and contiguously in the program image. The layout system then establishes that the selected ordered pair of code portions are to be positioned both in the order and contiguously in the program image. The layout system repeats this selecting and establishing until the order of all the code portions is established.

In another aspect, the present invention provides techniques for estimating the effect that the ordering of two code portions would have on the performance of the computer program. In one embodiment, the technique for estimating the effect assumes that the two code portions are positioned so that their boundary meets in the middle of a page. The technique bases its estimate of the effect on the time intervals in which one code portion is accessed and the other code portion is not accessed.

BRIEF DESCRIPTION OF THE DRAWINGS

FIGS. 3A–3D are diagrams illustrating the calculation of the metric value.

FIGS. 4A–4C illustrate the manipulation of the metric matrix.

FIGS. 5A–5C illustrate the use of a hint vector.

FIGS. 7A and 7B illustrate the use of an update list.

DETAILED DESCRIPTION OF THE INVENTION

Figure 1:
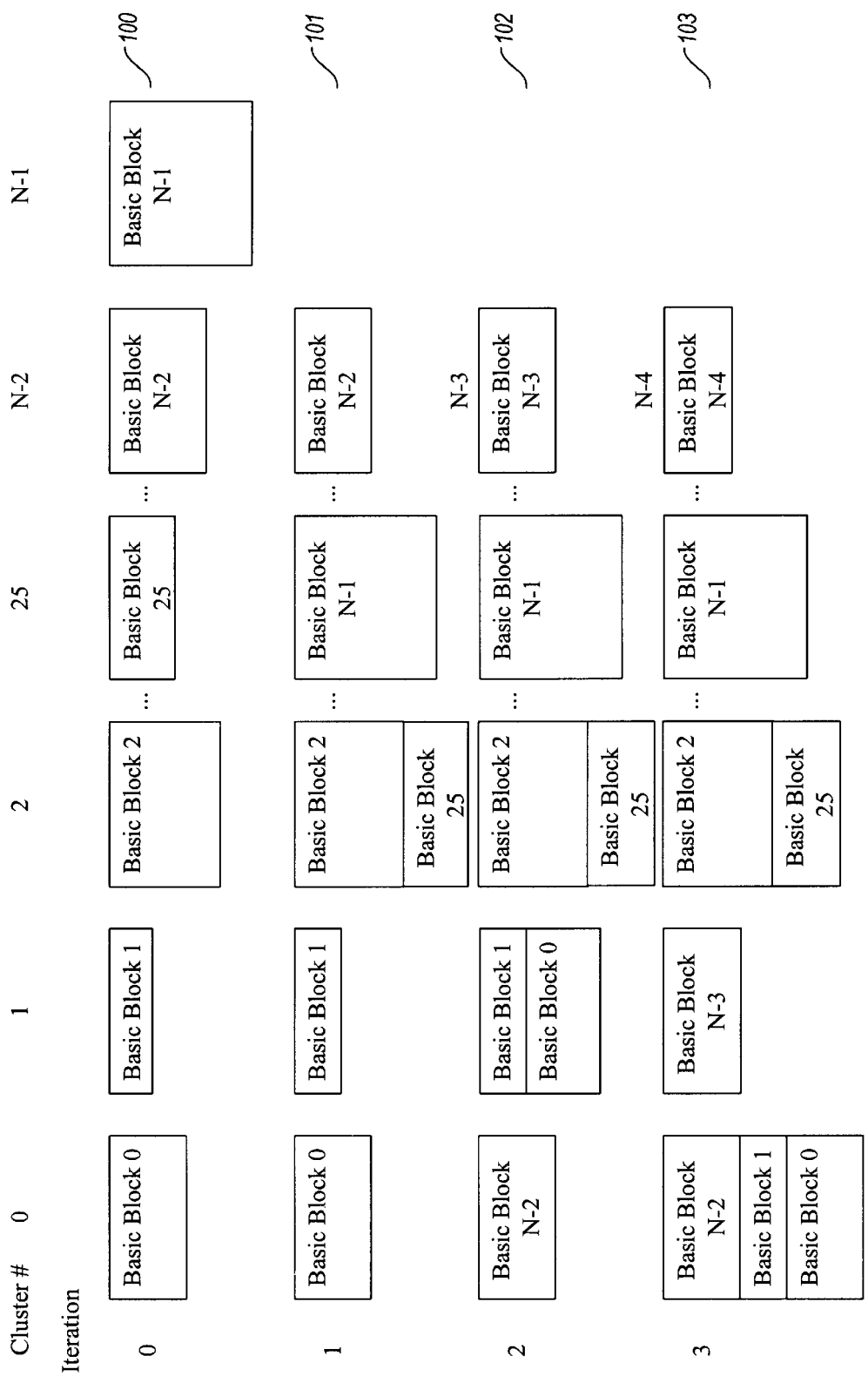
FIG. 1 is a diagram illustrating this greedy agglomerative clustering algorithm.

The present invention provides a layout method and system for ordering code portions of a program image of a computer program to reduce the working set of the computer program. In a preferred embodiment, the layout system evaluates the effect on the working set if each pair of code portions are ordered contiguously in the program image. For example, if the program image has 5 code portions, the layout system evaluates the effect on the working set if code portion 1 is followed by code portion 2, if code portion 1 is followed by Is code portion 3, if code portion 1 is followed by code portion 4, and if code portion 1 is followed by code portion 5. The layout system also evaluates the effect if code portion 2 is followed by code portion 1, if code portion 2 is followed by code portion 3, and so on. The number of possible ordering of pairs of code portions is $N^2-N$, where N is the number of code portions. To determine the ordering, the layout system initially selects that pair of code portions with the minimum effect on the working set and sets the ordering for that pair of code portions. For example, if code portion 4 followed by code portion 2 would have the minimum effect on the working set, the layout system establishes the ordering such that code portion 4 is immediately followed by code portion 2. The layout system then evaluates the effect on the working set if code portion 1 is followed by code portion 3, by code portion 4, or by code portion 5. Since it has already been established that code portion 2 follows code portion 4, code portion 2 cannot immediately follow code portion 1. Similarly, the layout system evaluates the effect if code portion 2 is followed by code portion 1, by code portion 3, or by code portion 5. When evaluating the effect of each pair of orderings, the layout system takes into consideration the already established orderings. For example, the effect if code portion 1 is followed by code portion 4 is the effect of code portion 1 followed by code portion 4 followed by code portion 2 since it has already been established that code portion 2 follows code portion 4. To facilitate processing, the layout system considers any pair of code portions whose order has been established to be a new code portion that contains the pair of code portions. The layout system effectively replaces code portions 2 and 4 with a new code portion that contains code portion 4 followed by code portion 2. Thus, the number of code portions is reduced by one. The layout system then re-evaluates the effect of the working set if each pair of the current code portions are ordered contiguously in the program image. The layout system again selects that pair of code portions that would have the minimum effect on the working set and defines a new code portion that contains the pair of code portions. The layout system repeats this process until only one code portion remains. This one remaining code portion represents the ordering of the initial code portions in the program image.

The layout system uses a metric function that provides a metric value that is an estimate of the effect on the working set of ordering a pair of code portions contiguously. The actual effect on the working set could only be determined assuming a certain ordering of the other code portions. However, since there are N! possible orderings of code portions, it would be impractical to determine the actual effect for all but the smallest program images. The metric function uses the temporal usage vector of each code portion to estimate the number of additional time intervals a page would be required to be in memory if the page contained the pair of code portions, rather than just one of the code portions. Thus, the smaller the estimated number of such time intervals, the smaller the effect on the working set. If the estimated number is 0, then there would no additional time intervals. Thus, the code portions could be advantageously ordered contiguously. If the estimated number is 1, then there would be 1 additional time interval. In general, pairs of code portions with smaller estimated numbers can be more advantageously ordered contiguously, than pairs of code portions with higher estimated numbers.

The layout system of the present invention uses an algorithm referred to as "greedy agglomerative clustering" to determine the ordering of the code portions. The algorithm is "greedy" in the sense that at each iteration it establishes the ordering for the pair of code portions with the smallest metric value. The algorithm is "agglomerative clustering" in the sense that the pair of code portions (initially, basic blocks) are agglomerated or concatenated to form a new code portion that is a cluster of the pair of code portions. FIG. 1 is a diagram illustrating this greedy agglomerative clustering algorithm. Initially, each basic block in the program image is assigned to a separate cluster. Therefore, initially there are N clusters, where N is the number of basic blocks. Through each iteration, the algorithm selects two clusters to be concatenated, concatenates the clusters to form a new cluster, and replaces the selected clusters with the new cluster. Thus, after each iteration, the number of clusters is reduced by one. Therefore, after N-1 iterations only one cluster remains that contains all the basic blocks in their established order. Line 100 illustrates the basic blocks assigned to each cluster initially. There are N basic blocks, which are identified as basic block 0, basic block 1, ... , and basic block N-1 and which are initially assigned to cluster 0, cluster 1, ... , and cluster N-1, respectively. Line 101 illustrates the layout of the clusters after the first iteration. At the beginning of each iteration, the algorithm calculates the metric value for each ordered pair of clusters. For example, the metric value for concatenating cluster 1 onto cluster 0 was calculated, for concatenating cluster 2 onto cluster 0 was calculated, etc. Also, the metric value for concatenating cluster 0 onto cluster 1 was calculated, for concatenating cluster 2 onto cluster 1 was calculated, and etc. Thus, the number of metric values calculated is on the order of the number of clusters squared. The metric values can be represented by an N-by-N matrix. The element at each row and column of the matrix contains the metric value associated with concatenating the cluster with that column number onto the cluster with that row number. The values in the elements of the diagonal of the matrix are undefined since it makes no sense to concatenate a cluster with itself. In this example, the ordering of basic block 2 followed by basic block 25 has the smallest metric value. Thus, basic block 25 is selected to be concatenated onto basic block 2 to form a new cluster. That new cluster is numbered as cluster 2. After each iteration, the number of clusters is reduced by 1. In this example, the last cluster, cluster N-1, was renumbered as cluster 25, so that the cluster numbers remain sequential, that is, from cluster 0 to cluster N-2. Line 102 illustrates the clusters after the second iteration. At the beginning of the second iteration, the algorithm could recalculate all the metric values for the current clusters. However, only the metric values relating to cluster 2 would be different. The metric function bases the metric value only on the two clusters in the pair of clusters. Thus, the creation of a new cluster would only effect the metric values for pairs of clusters that include the new cluster. Thus, the system preferably only recalculates the metric values that involve the new cluster, cluster 2. In this example, the second iteration selected that cluster 0 was to be concatenated onto cluster 1 based on the minimum metric value. After cluster 0 is concatenated onto cluster 1, the algorithm renumbers cluster N-2 as cluster 0 to keep the cluster numbers sequential, that is, from cluster 0 to cluster N-3. Line 103 illustrates the clusters after the third iteration. In this example, cluster 1 was selected to be concatenated onto cluster 0. The algorithm then renumbered cluster N-3 to cluster 1. The algorithm continues until only one cluster that contains all the code portions in their established order remains.

Figure 2:
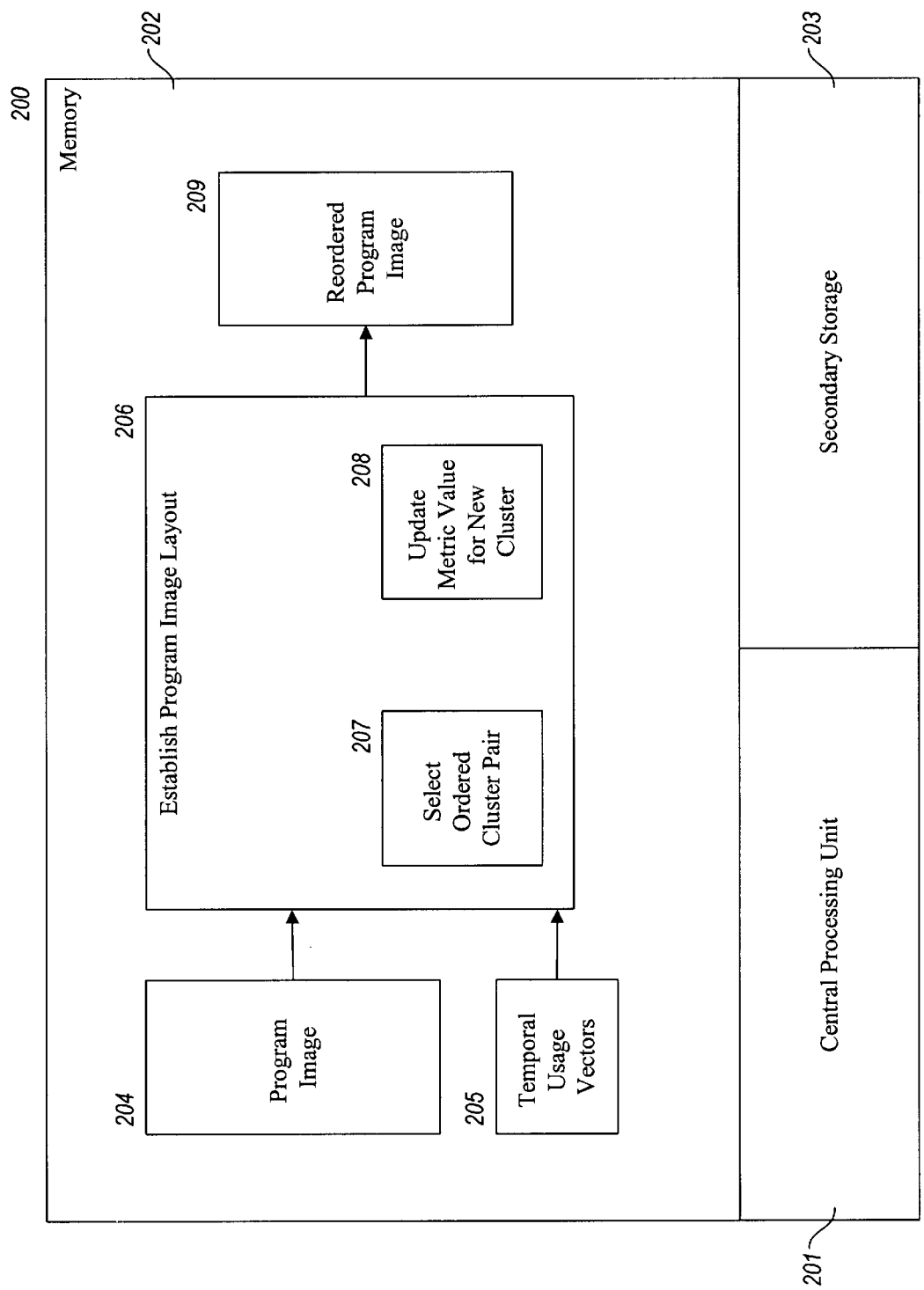
FIG. 2 is a block diagram illustrating the components of the layout system.

FIG. 2 is a block diagram illustrating the components of the layout system. The layout system is preferably executed on a computer system that includes a central processing unit 201, a memory 202, and a secondary storage 203. As shown, the memory contains the program image 204 that is to be reordered, temporal usage vectors 205, an establish program image layout subsystem 206 and the resulting reordered program image 209. The establish program image layout subsystem includes a select ordered cluster pair component 207 and an update metric value for new cluster component 208. The secondary storage includes a disk drive and other computer-readable medium such as a CD-ROM. The establish program image layout system is initially loaded from the secondary storage.

In one embodiment, the metric function estimates the "air" for each cluster in a pair of clusters. The air of a cluster is not the number of time intervals during which the page on which a cluster resides is accessed, but that the cluster is not accessed times the size of the cluster. The total amount of air for a page is an indication of the similarity of the access patterns of the clusters on that page. By minimizing the amount of air, those clusters with similar access patterns are advantageously placed on the same page. The metric value used by the system is an estimate of the amount of air resulting if the ordered pair of clusters are concatenated. Since the actual page layout of the program image is not known, the system cannot determine the actual amount of air that would be introduced by concatenating an ordered pair of clusters. Thus, the system estimates the amount of air.

Figure 3C:
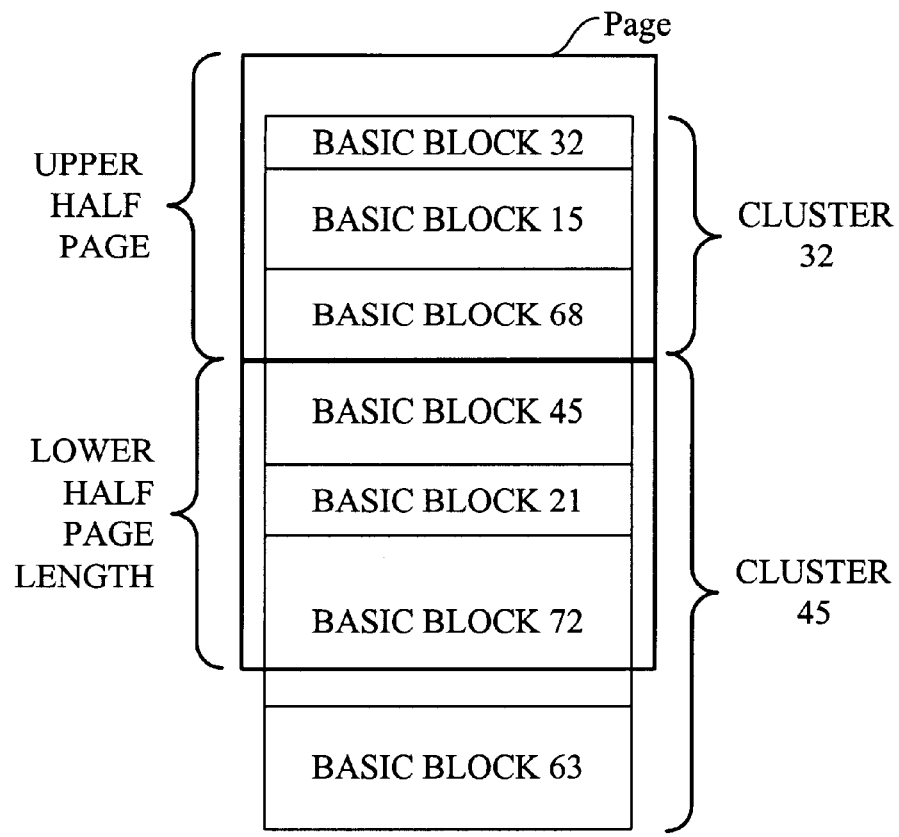
Figure 3D:
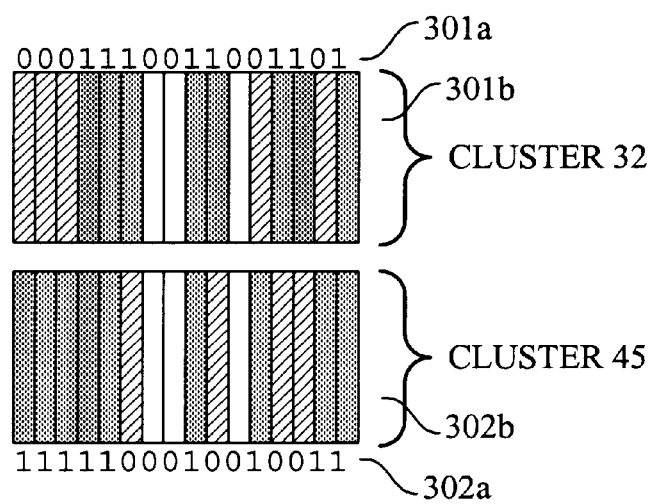

The system estimates the amount of air that would result from concatenating one cluster onto another cluster by assuming that only those two clusters are on a page and that the cluster boundaries will meet in the middle of a page. FIGS. 3A–3D illustrate how the system estimates the amount of air. FIG. 3A is a block diagram illustrating the basic blocks in sample cluster 45 and cluster 32 for which an estimate of air for concatenating cluster 32 onto cluster 45 is to be calculated. FIG. 3B is a table of the temporal usage vector and the size for each basic block of clusters 32 and 45. Cluster 45 contains basic block 45, basic block 21, basic block 72, and basic block 63, and thus has a total size of 80. Cluster 32 contains basic block 32, basic block 15, and basic block 68, and thus has a total size of 36. FIG. 3C illustrates the concatenation of cluster 32 onto cluster 45. The size of the page in this example is 100. Cluster 32 fits entirely in 36 of the 50 memory locations in the upper half of the page. Cluster 45 exceeds the size of the lower half of the page, which accommodates all of blocks 45 and 21 and part of block 72. FIG. 3D illustrates the concept of air graphically. The temporal usage vector 3D01*a* for cluster 32 and the temporal usage vector 3D02*a* for the portion of cluster 45 that fits onto the page is shown. The temporal usage vector of the cluster is the logical-OR of the temporal usage vectors of the basic blocks in the cluster. The graph 3D01*b* and the graph 3D02*b* illustrate the temporal usage vectors for cluster 32 and cluster 45. Each shaded portion of the graphs corresponds to a 1 in the corresponding bits of the temporal usage vector. For example, since temporal usage vector 3D01*a* contains a 1 for time intervals 3, 4, 5, 8, 9, 12, 13, and 15, the corresponding portions of graph 3D01*b* are shaded. The empty portions and the cross-hatched portions of the graphs correspond to a 0 in the corresponding bits of the temporal usage vector. For example, since cluster usage vector 3D01a contains a 0 for the time intervals 0, 1, 2, 6, 7, 10, 11, and 14, the corresponding portions of graph 3D01b are empty or cross-hatched. The cross-hatched portions of the graph indicate that air results during that time interval from the concatenation of the two clusters. That is, the cross-hatched portions correspond to a setting of 0 in one bit of a temporal usage vector and a setting of 1 for the corresponding bit in the other temporal usage vector. Thus, the cross-hatched portions indicate the amount of air introduced when the clusters are concatenated at the middle of a page.

The system estimates the air by multiplying the size of each cluster that is on a page by the number of cross-hatched portions for that cluster and adding these products together. Since cluster 32 has a size of 36 and there are five cross-hatched portions in graph 3D01b, the product for cluster 32 is 180. Since cluster 45 has a size of 50 that is on the page and there are four cross-hatched portions in graph 3D02b, the product for cluster 45 is 200. The sum of these products is thus 380, which is a metric value of the total amount of air estimated to be added by the concatenation of cluster 32 onto cluster 45.

As discussed above, through each iteration of the algorithm, the metric values only need to be recalculated for the new cluster. To track the previously calculated metric values, the system maintains a metric matrix, which contains the metric values for each ordered pair of clusters. FIGS. 4A–4C illustrate the manipulation of the metric matrix. FIG. 4A is an example of a metric matrix for eight clusters. For example, the metric value when cluster 5 is concatenated onto cluster 2 is 32 as shown by the value 32 in the element of row 2 and column 5. Conversely, the metric value when cluster 2 is concatenated onto cluster 5 is 37 as shown by the value 37 in the element of row 5 and column 2. Since a cluster cannot be concatenated onto itself, the diagonal of the metric matrix contains the largest possible metric value as represented by the infinity symbol in each element. Since the system concatenates a pair of clusters with the smallest metric values, the system would not select to concatenate a cluster onto itself. The system selects an ordered pair of clusters to concatenate by selecting the element with the minimum metric value and selecting the clusters identified by the row and column numbers of that element. In this example, the element at row 2 and column 5 contains the smallest metric value of 32. Thus, the system selects to concatenate cluster 5 onto cluster 2. The new cluster is number 2, which consists of previous clusters 2 and 5. However, there is now no cluster 5. To facilitate the processing, the system keeps the cluster numbers sequential. Therefore, the system renumbers the cluster with the highest number to the number of the cluster that was concatenated onto another cluster. In this example, the system renumbers cluster 7 as cluster 5 and adjusts the metric matrix accordingly. FIG. 4B illustrates the adjusted metric matrix. The system adjusts the matrix by copying column 7 onto column 5 and copying row 7 onto row 5 because cluster 7 is being renumbered as cluster 5. Row 7 and column 7 are then removed from the matrix. Once the last row and column have been copied, the system recalculates the metric values relating to the new cluster, in this example, cluster 2. Since cluster 2 now contains the additional basic blocks from previous cluster 5, the previously calculated metric values may be incorrect. The metric values relating to cluster 2 are contained in row 2 and column 2. Thus, the system recalculates each metric value in row 2 and column 2. FIG. 4C illustrates the results of the recalculation of the metric values relating to cluster 2.

The size of the metric matrix can be very large. For example, a complex computer program can have 10,000 basic blocks. Thus, the metric matrix would have 100,000,000 ($10,000^2$) elements. The amount of time needed to search such a large matrix for the smallest metric value can be prohibitive. Consequently, the system uses several optimization techniques to improve the speed of selecting the element with the smallest metric value. In one embodiment, the system maintains a hint vector containing an entry corresponding to each row in the metric matrix. Each entry in the hint vector contains a metric value that is less than or equal to the minimum metric value in the corresponding row of the metric matrix. Thus, no row will have a metric value that is less than the value indicated in the hint vector. By using the hint vector, the system does not need to scan the entire metric matrix to find the element with the smallest metric value. Rather, the system scans the hint vector to determine which row may contain the smallest metric value and then searches that row to determine the element that contains the smallest metric value. Since the entry in the hint vector (for reasons described below) may contain a metric value that is less than the smallest metric value in the corresponding row, that selected row may not contain the smallest metric value of the metric matrix. Consequently, if the entry contains a metric value that is less than the smallest value in the corresponding row, the system updates the entry with the smallest value in the row and again scans the hint vector searching for the entry with the smallest metric value.

During each iteration, when the row and column for the new cluster are updated with the recalculated metric values, the hint vector is also updated. In particular, the metric value in the hint vector corresponding to the row of the new cluster is set to the minimum of the updated metric values in the corresponding row. Also, when the last row is copied onto the row corresponding to the cluster that was concatenated onto a cluster, the value from the hint vector is copied. This ensures that the hint vector will contain metric values that are equal to or smaller than the minimum metric value in the corresponding row. A hint vector entry may contain a metric value that is smaller than the smallest value in the corresponding row. This occurs when the smallest value is overwritten by a larger value during the updating of a column. In such a case, the remaining smallest value in the row could be determined by scanning the row. However, the system avoids scanning through the entire row at this time and does not update the hint vector entry to ensure that it contains the actual smallest value. The scanning of the row is thus deferred until it is determined that that row may contain the smallest metric value in the matrix based on the value in the hint vector entry.

FIGS. 5A–5C illustrate the use of a hint vector. To locate the smallest metric value in the matrix, the system scans the hint vector of FIG. 5A finding the minimum value in the entry for row 2, which contains a metric value of 32. The system then scans row 2 to locate the element in the row with the smallest metric value, which is the element in column 5. Thus, the system finds the smallest metric value without checking each element in the matrix. FIG. 5B illustrates the matrix and hint vector after cluster 5 is concatenated onto cluster 2. When the system updated the element of row 0 and column 2 to a metric value of 46, it also updated the hint vector entry for row 0 since the metric value of 46 is less than the metric value of 47 previously in the entry. The system also updated the hint vector entry in row 2 when the metric values for the new cluster were calculated, and it copied the hint vector entry from row 7 to the hint vector entry in row 5 when the row of the matrix was copied. However, no other hint vector entries were updated. The system then scans the hint vector of FIG. 5B for the smallest metric value, which is in the hint vector entry for row 1. However, the smallest metric value in row 1 is 45. So, the system updates the hint vector entry for row 1 to 45 as shown in FIG. 5C. The system again scans the hint vector for the smallest metric value, which is the value of 36 in the entry corresponding to row 4. Since row 4 contains a metric value of 36 in column 1, the element for row 4 and column 1 contains the smallest metric value in the matrix.

Figures 6A, 6B:
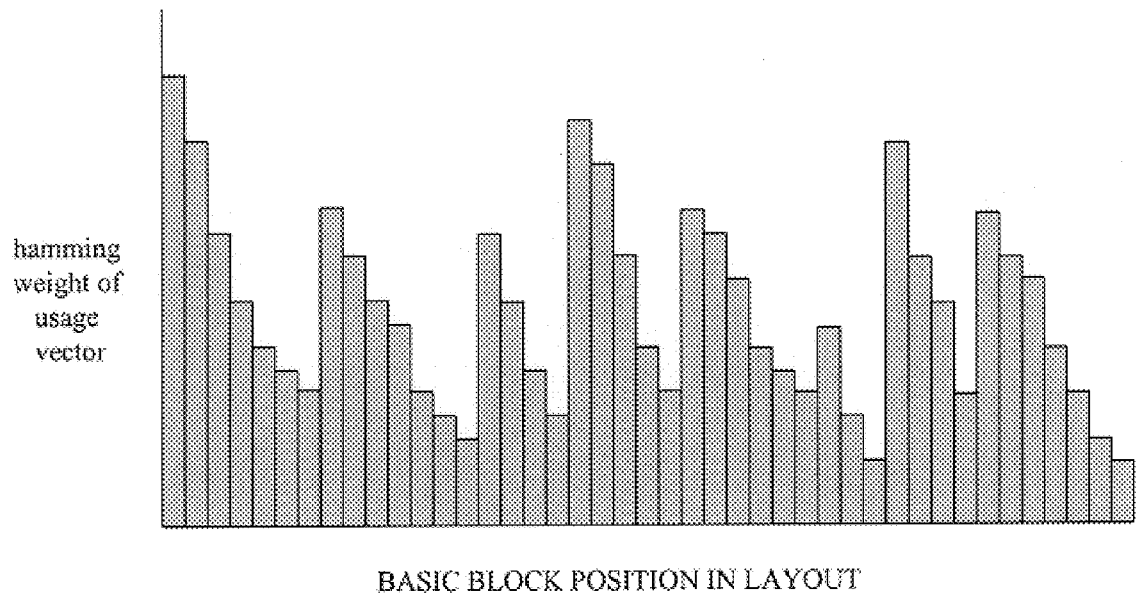
FIGS. 6A–6B illustrate an implementation of decaying sawtooth heuristic.

It has been empirically observed that program layouts with low values of the metric function have certain characteristics. It is thus advantageous to incorporate heuristics that favor such characteristics into the layout system, in order to improve the likelihood of achieving a good layout. One such characteristic is illustrated in FIG. 6A, showing the hamming weight (the number of bits set) of the usage vector for each basic block, versus the position of the basic block in the layout. From the figure, it can be seen that the hamming weight follows a decaying sawtooth pattern, gradually decreasing, then sharply increasing somewhat, then continuing to slowly decrease, in a repeated pattern. In one embodiment, the system employs a heuristic that tends to achieve layouts with this decaying sawtooth characteristic. The heuristic employed sets one of the metric values of the two orderings of a pair of clusters to the highest possible metric value. This setting ensures that the pair of clusters will not be concatenated in that order. The system selects which ordering to set to the highest possible metric value based on an ordering metric for each cluster. One such ordering metric is the maximum hamming weight of a basic block within the cluster. (Alternatively, the bit for each time interval can be weighted as described in the copending patent application entitled "Method and System for Incrementally Improving a Program Layout.") In particular, the system sets the highest possible metric value for the ordering in which the cluster with the larger value of the ordering metric is concatenated onto the other cluster. Thus, clusters are always ordered based on decreasing number of bits that are set in the temporal usage vectors of their constituent basic blocks. For example, as shown in FIG. 4A, the metric value for cluster 5 concatenated onto cluster 2 is 32, and the metric value for cluster 2 concatenated onto cluster 5 is 37. Because the system determines that the number of bits set in the temporal usage vector for cluster 2 is greater than that for cluster 5, the system replaces the metric value of 37 in the element of row 5 and column 2 to the largest possible metric value, which is represented by the infinity symbol. FIG. 6B illustrates the matrix of FIG. 4A with one metric value of each pair of clusters replaced by the infinity symbol. For example, the element in row 5 and column 2 contains the infinity symbol.

Since the size of a metric matrix can be very large, the entire matrix may not be able to fit into the memory of the computer system. This size is not a particular problem for scanning and updating of the rows of the matrix when stored in row-major order. However, it is a problem for the updating of the columns of the matrix. When stored in row-major order, the rows of a matrix would be stored contiguously in memory. Thus, if one element of a row is loaded into memory, the other elements of the row are likely to be also loaded in memory. However, just because one element of a column is loaded in memory, the other elements of that column are not necessarily loaded in memory. Thus, the updating of the elements of a column may require the loading of each element from secondary storage into memory separately. To reduce the number of times that a column needs to be updated and thus the number of times secondary storage is accessed, the system only updates a column in the two rows that it is already modifying at each iteration (i.e., the row that corresponds to the new cluster and the row that corresponds to the renumbered cluster). All other updates (i.e., the column that corresponds to the new cluster and the column that corresponds to the renumbered cluster) are stored into a vector of linked lists. The vector contains a linked list (referred to as an "update list") and a size for each row of the matrix. The size indicates the number of columns that were in the matrix when the first update entry in the current update list was added. At each iteration, the system adds an update entry to each update list (except for those two rows that were updated). The update entry identifies the two columns to be updated and the metric value for the new cluster. The metric value for the renumbered cluster is not stored in the update entry because the metric value from the last column would need to be accessed and the accessing of columns preferably is to be avoided. The size identifies the last column and thus indirectly identifies the metric value. When the system is to scan a row when searching for the smallest metric value in the matrix, the system first updates the elements in the row based on the update list. The system retrieves each update entry and updates the two identified columns. The size corresponding to the row identifies the column for which the metric value for the renumbered row of the first update entry is to be retrieved. The metric value for the renumbered row of the second update entry is the next lower column number, and so on. After the elements of the row are updated with the values from the update list, the update list is cleared, and the size value for the row is reduced by the number of updates that were made.

FIGS. 7A and 7B illustrate the use of an update list. In the example of FIG. 7A, cluster 5 was concatenated onto cluster 2. Thus, row 7 should be copied onto row 5, column 7 should be copied onto column 5, and the metric values of row 2 and column 2 should be updated. However, since metric values are only updated when an entire row is updated, only the metric values in the elements of rows 2 and 5 have been updated (as have the entries of the hint vector), but metric values in the elements of columns 2 and 5 of the other rows have not been updated. Instead, an update entry has been created for those two elements not updated and stored in the update list for the corresponding row. The update list for row 0 indicates that column 2 should have the metric value of 46 and that column 5 should be copied from the final column as indicated by the value of 8 in the size vector. When the system selects the hint vector entry with the minimum metric value, the system then applies the update list to the row corresponding to the selected entry. Since the system is already accessing the row, the entire row is loaded into memory and the overhead in additionally applying the update list is relatively small. In this example, hint vector entry 1 has the minimum metric value of 35. Before the system searches row 1 for its minimum value, the system applies the update list for row 1 to the row. The system overwrites the value of infinity in column 2 with another infinity value and overwrites the value of 35 in column 5 with the value of infinity from column 7 as indicated by the size vector. The update list for row 1 is then cleared, and the size value for row 1 is reduced from 8 to 7. Since the minimum in the row is infinity, which is not equal to the value found in the hint vector, the system updates hint vector entry 1 to reflect this minimum metric value. The system then repeats the search of the hint vector. The system finds a minimum metric value of 36 in entry 4. Before the system searches row 4, the system applies the update list for row 4. The system overwrites the value of infinity in column 2 with another infinity value and overwrites the value of 39 in column 5 with the value of infinity from column 7. The update list for row 4 is then cleared, and the size value for row 4 is reduced from 8 to 7. The system finds a minimum metric value of 36 in column 1, which equals the value found in the hint vector, and is thus the minimum metric value in the matrix. FIG. 7B shows the results after the minimum metric value of the matrix of FIG. 7A is found.

When multiple matrix elements contain the same minimum metric value, the system randomly selects one entry. For example, the matrix in FIG. 7B contains two values of 51 if there were no lower values in the matrix than this, then there would be two possible choices for the next concatenation: either cluster 4 concatenated onto cluster 2 or cluster 5 concatenated onto cluster 3.

Figure 8:
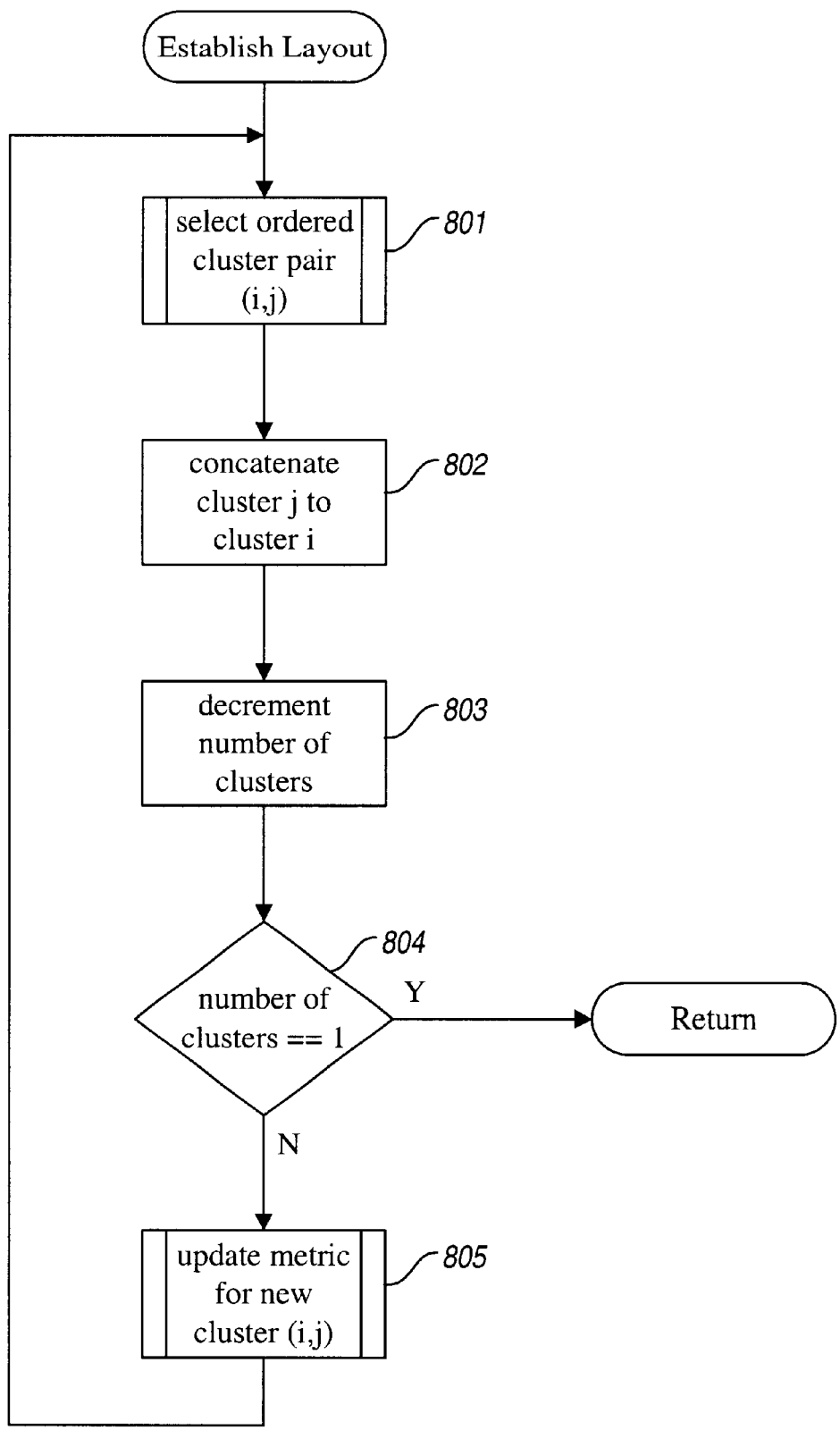
FIG. 8 is a flow diagram of an implementation of a routine to establish a layout of a program image.

FIGS. 8–13 are flow diagrams illustrating an implementation of the layout system. These flow diagrams illustrate the use of the metric matrix with the hint vector. FIG. 8 is a flow diagram of an implementation of a routine to establish a layout of a program image. The routine initially calculates a metric value for both orderings of each pair of clusters. In 801, the routine selects an ordered cluster pair (i, j) from the current clusters whose concatenation will result in the minimal effect on the working set (i.e., minimum metric value). In step 802, the routine concatenates cluster j onto the end of cluster i to form a new cluster i. In step 803, the routine decrements the number of clusters. In step 804, if the number of clusters is equal to one, then the routine returns, else the routine continues at step 805. In step 805, the routine updates the metric matrix values for the new cluster i and loops to step 801 to select the next ordered pairs of clusters.

Figure 9:
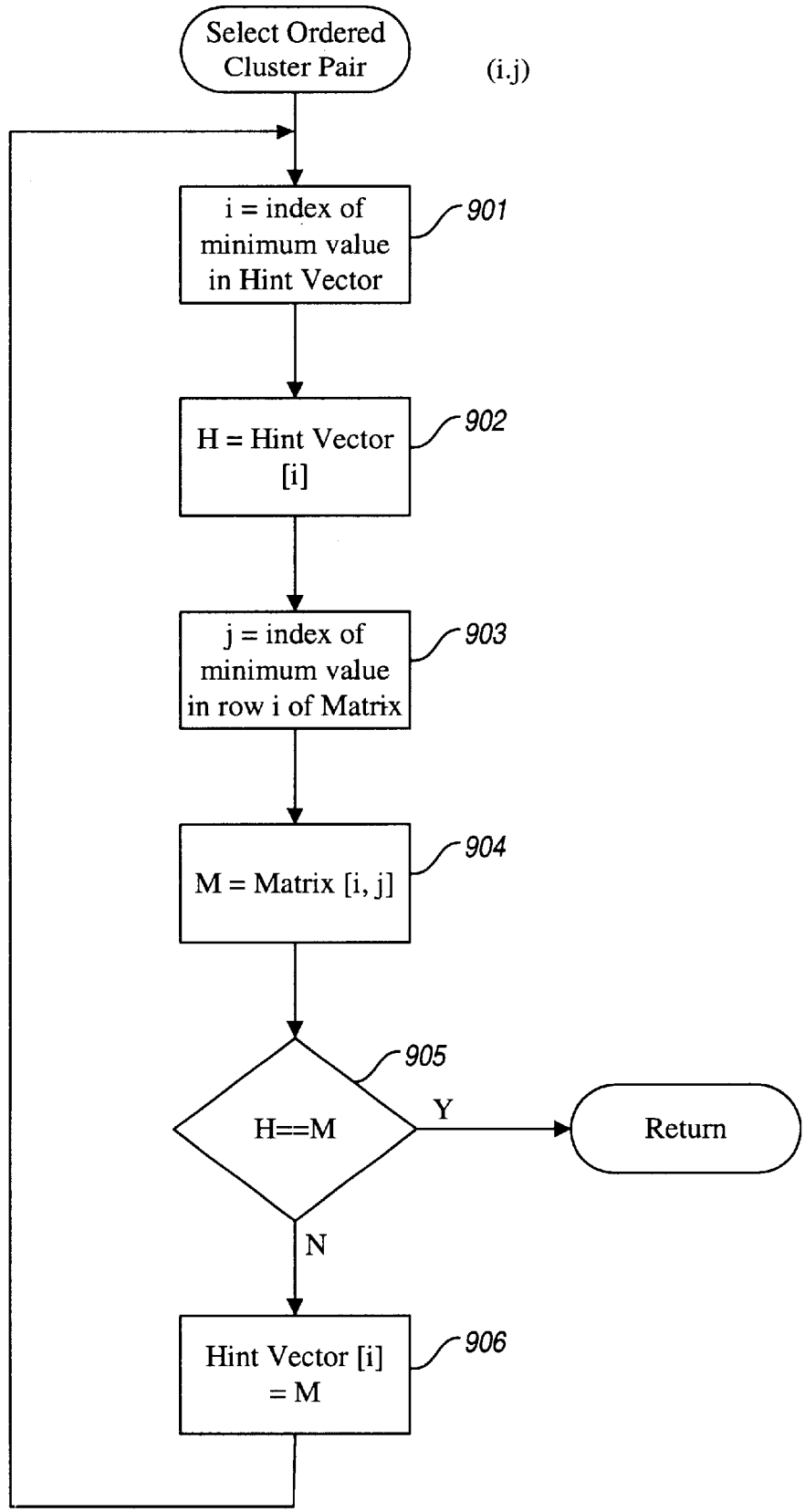
FIG. 9 is a flow diagram of an implementation of a routine to select an ordered pair of clusters to concatenate.

FIG. 9 is a flow diagram of an implementation of a routine to select an ordered pair of clusters to concatenate. The routine returns the identification of the clusters to concatenate in parameters i and j. In step 901, the routine sets the parameter i equal to the index of the minimum metric value in the HintVector. In step 902, the routine sets the variable H equal to the value of the $i^{th}$ entry in the HintVector. In step 903, the routine sets the parameter j equal to the index of the column of the element that contains the minimum metric value in the $i^{th}$ row of the MetricMatrix. In step 904, the routine sets the variable M equal to the metric value in the $i^{th}$ row and the $j^{th}$ column of the MetricMatrix. In step 905, if the variable H is equal to the variable M, then the indexes i and j identify the element of the MetricMatrix with the smallest metric value, and the routine returns, else the routine continues at step 906. In step 906, the routine sets the $i^{th}$ entry of the HintVector equal to the variable M to ensure that the entry contains the smallest metric value of the $i^{th}$ row and loops to step 901 to again select the minimum metric value in the HintVector.

Figure 10:
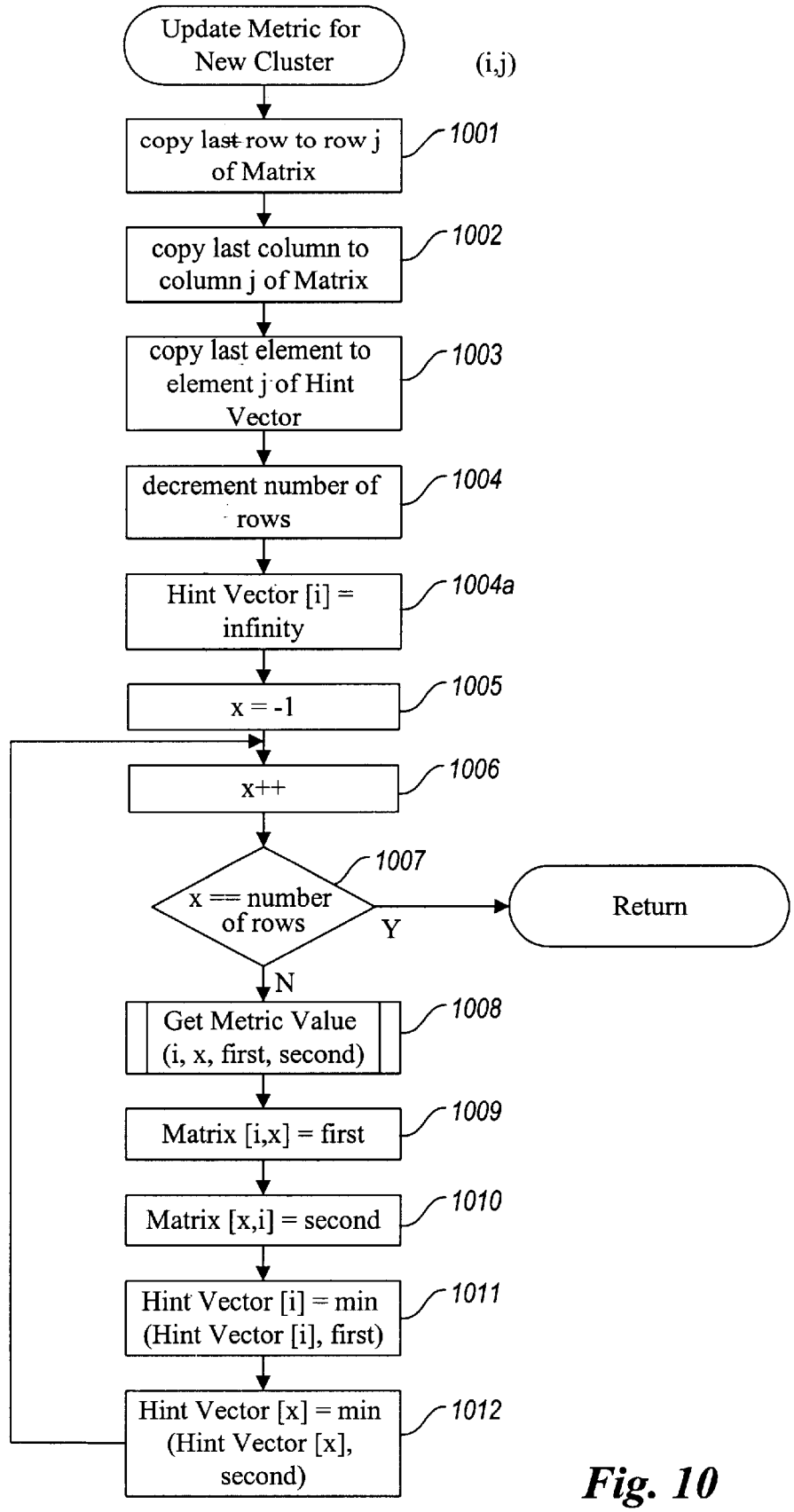
FIG. 10 is a flow diagram of an implementation of a routine to update the value in the MetricMatrix for a new cluster.

FIG. 10 is a flow diagram of a routine to update the value in the MetricMatrix for a new cluster. The routine is passed the row and column indexes that identify the ordered pair of clusters that were concatenated. In step 1001, the routine copies the last row in the MetricMatrix to the $j^{th}$ row of the MetricMatrix. In step 1002, the routine copies the last column of the MetricMatrix to the $j^{th}$ column of the MetricMatrix. In step 1003, the routine copies the last entry of the HintVector to the $j^{th}$ entry of the HintVector. In step 1004, the routine decrements the number of rows in the MetricMatrix. Since the matrix is square, the number of rows is also the number of columns. In step 1004a, the routine initializes the $i^{th}$ entry of the HintVector to the largest possible metric value. In steps 1005–1012, the routine loops calculating the new metric values for the new cluster and updating the MetricMatrix and the HintVector accordingly. In step 1005, the routine initializes the variable x to a negative one. The variable x is used as an index for the clusters represented by the MetricMatrix. In step 1006, the routine increments the variable x. In step 1007, if the variable x is equal to the number of rows in the MetricMatrix, then the routine returns, else the routine continues at step 1008. In step 1008, the routine invokes the routine GetMetricValue to return the metric value for the ordered pair of the $i^{th}$ cluster concatenated with the $x^{th}$ cluster and the ordered pair of the x cluster concatenated with the $i^{th}$ cluster. The metric value is returned in the variables first and second. In step 1009, the routine sets the metric value in the element of the MetricMatrix index by the variables i and x to the first variable. In step 1010, the routine sets the metric value in the element of the MetricMatrix indexed by the variable x and the variable i equal to the second variable. In step 1011, the routine sets the $i^{th}$ entry of the HintVector equal to the minimum of the $i^{th}$ entry of the HintVector and of the first variable. In step 1012, the routine sets the x entry of the HintVector equal to the minimum of the x entry of the HintVector and the second variable, and loops to step 1006 to select the next cluster.

Figure 11:
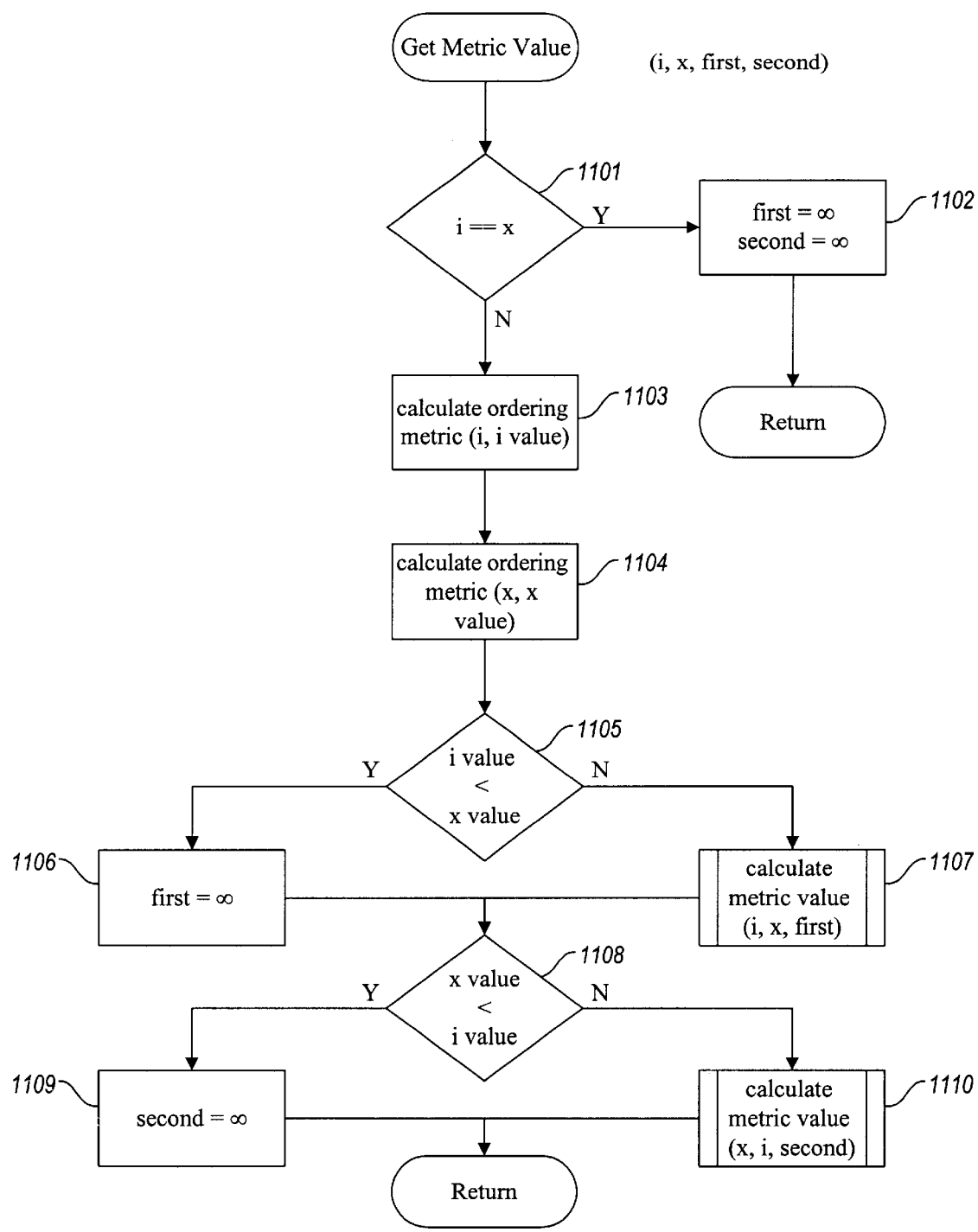
FIG. 11 is a flow diagram of an implementation of the routine GetMetricValue routine.

FIG. 11 is a flow diagram of an implementation of the routine GetMetricValue. The routine is passed the identification of two clusters and returns the metric value for each ordered pair of the clusters in parameters first and second. In step 1101, if the identified clusters are the same cluster, then the routine continues at step 1102, else the routine continues at step 1103. In step 1102, the routine sets the parameter first and the parameter second to indicate the largest possible metric value and returns. In step 1103, the routine calculates the ordering metric value for the first cluster. In one embodiment, the ordering metric value is the largest number of time intervals in which a basic block of the cluster is accessed. In step 1104, the routine calculates the ordering metric value for the second cluster. In step 1105, if the ordering metric value of the first cluster is less than the ordering metric value of the second cluster, then the routine continues at step 1106, else the routine continues at step 1107. In step 1106, the routine sets the parameter first to indicate the largest possible metric value and continues at step 1108. In step 1107, the routine invokes the routine CalculateMetricValue for the ordering of the first cluster followed by the second cluster and then continues at step 1108. In step 1108, if the ordering metric value of the second cluster is less than the ordering metric value of the first cluster, then the routine continues at step 1109, else the routine continues at step 1110. In step 1109, the routine sets the parameter second to indicate the largest possible metric value and returns. In step 1110, the routine invokes the routine CalculateMetricValue to determine the metric value for the ordering of the second cluster followed by the first cluster and returns.

Figure 12:
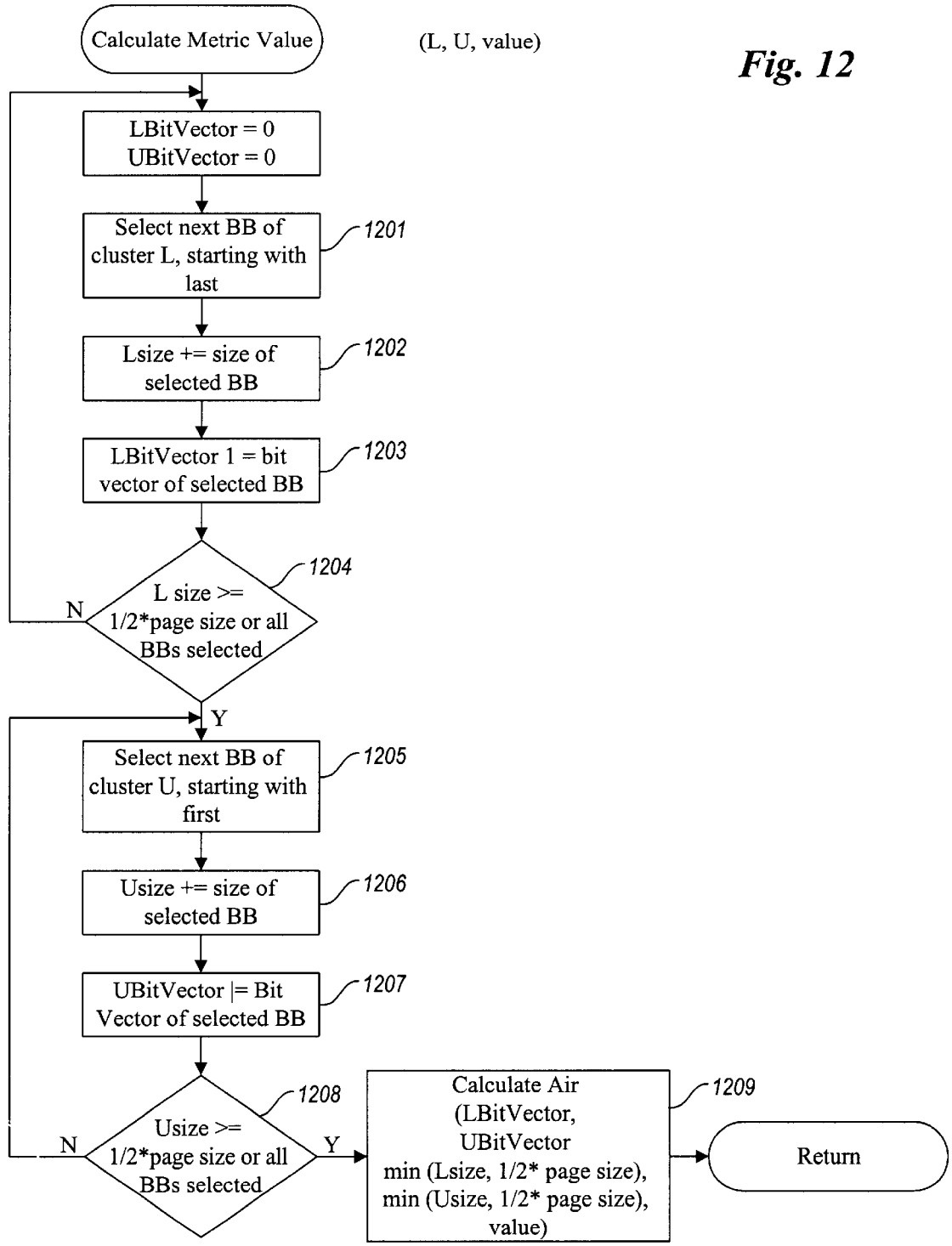
FIG. 12 is a flow diagram of an implementation of the CalculateMetricValue routine.

FIG. 12 is a flow diagram of an implementation of the CalculateMetricValue routine. The routine is passed the identification of a cluster that is to be concatenated onto another cluster. The routine returns a metric value for the clusters. The routine assumes that the cluster identified by is parameter L is to be positioned in the lower portion of a page and the cluster identified by parameter U is to be positioned in the upper portion of a page. In steps 1201–1204, the routine loops calculating the temporal usage vector for the lower portion of the page. In step 1201, the routine selects the next basic block of the lower cluster starting with the last basic block. In step 1202, the routine increments the variable Lsize by the size of the selected basic block to indicate the size of the lower cluster that will fit onto the lower portion of the page. In step 1203, the routine sets the vector LBitVector equal to the logical-OR of the vector LBitVector and the temporal usage vector of the selected basic block. In step 1204, if the variable Lsize is greater than or equal to half the page size or all the basic blocks in the lower cluster have already been selected, then the routine continues at step 1205, else the routine loops to step 1201 to select the next basic block of the lower cluster. In steps 1205–1208, the routine loops calculating the temporal usage vector for the upper portion of the page. In step 1205, the routine selects the next basic block of the upper cluster starting with the first basic block. In step 1206, the routine increments the variable Usize by the size of the selected basic block to indicate the size of the upper cluster that will fit onto the upper portion of the page. In step 1207, the routine sets the vector UBitVector equal to the logical-OR of the UBitVector and the temporal usage vector of the selected basic block. In step 1208, if the variable Usize is greater than or equal to half the page size or all the basic blocks in the upper cluster have already been selected, then the routine continues at step 1209, else the routine loops to step 1205 to select the next basic block of the upper cluster. In step 1209, the routine invokes the routine CalculateAir to calculate the metric value for the concatenation of the clusters and then returns.

Figure 13:
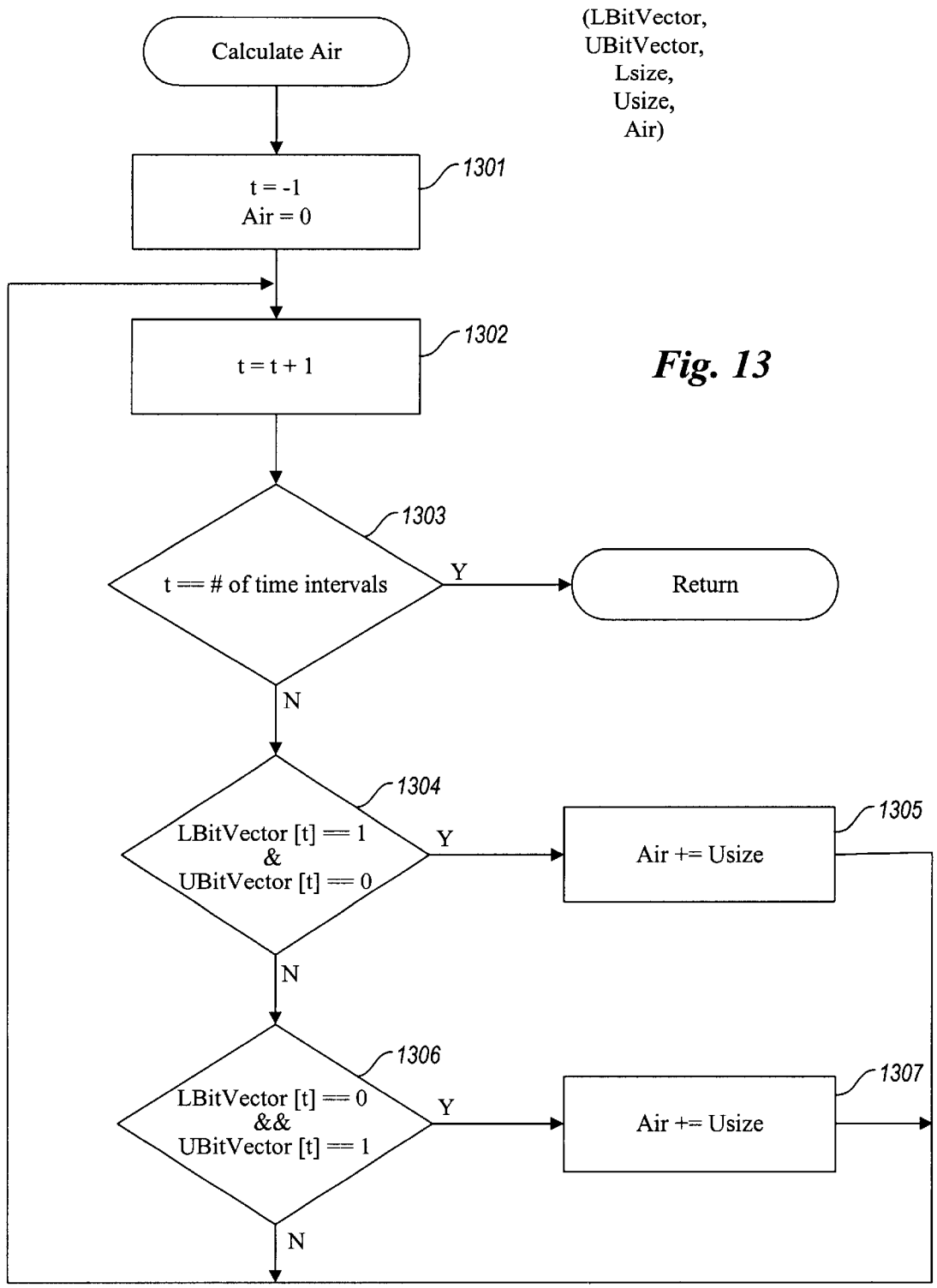
FIG. 13 is a flow diagram of an implementation of the CalculateAir routine.

FIG. 13 is a flow diagram of an implementation of the CalculateAir routine. The routine is passed a temporal usage vector for the lower cluster and a temporal usage vector for the upper cluster when they are positioned on a page and is passed the portion of the size of the lower cluster and upper cluster that would fit on the page. The routine calculates and returns the estimated amount of air in the parameter so named. In step 1301, the routine initializes the variable t to a minus one and variable Air to zero. The variable t is used to index through the time intervals. In step 1302, the routine increments the variable t. In step 1303, if the variable t is equal to the number of time intervals, then the routine returns, else the routine continues at step 1304. In step 1304, if the lower cluster is accessed during the $t^{th}$ time interval and the upper cluster is not accessed during the $t^{th}$ time interval, then the routine continues at step 1305, else the routine continues at step 1306. In step 1305, the routine increments the variable Air by the parameter Usize and loops to step 1302. In step 1306, if the lower cluster is not accessed during the $t^{th}$ time interval and the upper cluster is accessed during the $t^{th}$ time interval, then the routine continues at step 1307, else the routine loops to step 1302. In step 1307, the routine increments the variable Air by the variable Lsize and loops to step 1302 to select the next time interval.

From the foregoing it will be appreciated that, although specific embodiments of the invention have been described herein for purposes of illustration, various modifications may be made without deviating from the spirit and scope of the invention. In particular, various different metric functions can be used to estimate the effect of concatenating a pair of clusters. For example, the metric value could be the count of the number of time intervals in which air occurs. Also, if the metric matrix was stored in column-major order, rather than row-major order, the update list would be associated with each column, rather than each row. Also, the system could initially combine basic blocks that have the same temporal usage pattern into an aggregate basic block. It would be advantageous to have these basic blocks near each other because having with the same temporal usage pattern tends to reduce the working set and would be advantageous to reduce the number of basic blocks before clustering because the performance of the layout system improves as the number of initial clusters are reduced. Also, the system can advantageously rearrange blocks of data so long as a temporal usage pattern can be derived for those blocks. For example, the temporal usage vector of a block of data can be approximated as the logical-OR of all the temporal usage vectors of basic blocks that contain an explicit reference to that block of data. Such a static analysis of explicit references can be preferable to the overhead incurred by instrumenting the program image to track all references to a block of data. In addition, one skilled in the art would appreciate that the use of a hint vector and update list may be used to speed matrix processing that is unrelated to the reordering of a program image. In general, such techniques can be used to locate both minimum and maximum values in a matrix (i.e., extreme values). Accordingly, the invention is not limited except as by the appended claims.

What is claimed is:

1. A method in a computer system for establishing a program image layout of a computer program, the computer program comprising basic blocks, each basic block having a temporal usage vector indicating time intervals during which the basic block was accessed during an execution of the computer program, the method comprising:

for each of the basic blocks, initializing a cluster to contain that basic block; and repeating the following until one cluster remains that contains all of the basic blocks, for each possible ordered pair of clusters, determining a metric value for the ordered pair of clusters, the metric value being derived from the temporal usage vectors of the basic blocks of the cluster and estimating an effect on the performance of the computer program when that ordered pair of clusters are positioned in the program image in that order and contiguously;

selecting the ordered pair whose metric value estimates the smallest effect on the performance of the computer program; and replacing the clusters of the selected ordered pair of clusters with a new cluster that includes the basic blocks of the selected ordered pair.

2. The method of claim 1 wherein the determining of a metric value includes calculating the number of time intervals during which a basic block of one cluster of the ordered pair is accessed and during which no basic block of the other cluster of the ordered pair is accessed.

3. The method of claim 1 wherein each basic block has a size and wherein the determining of a metric value includes, for each time interval, summing the sizes of the basic blocks of the clusters of the pair which are not accessed during the time interval and for which a basic block of the other cluster that is on the same page is accessed.

4. The method of claim 3 wherein the metric value is the total of the sum of the sizes for each time interval.

5. The method of claim 3 wherein the clusters of a pair are assumed to be located contiguously in the middle of a page.

6. The method of claim 1 wherein the determining includes storing the metric values in a matrix so that those metric values not effected by the new cluster are not recalculated.

7. The method of claim 1 including determining an ordering metric for each cluster and, for each possible pair of clusters, setting a maximum possible metric value for the ordering of the pair of clusters for which the cluster with the lower ordering metric precedes the cluster with the higher ordering metric.

8. A method in a computer system for establishing a program image layout of a computer program, the computer program comprising code portions, each code portion having a temporal usage pattern indicating time intervals during which the code portion is required to be loaded into memory for access, the method comprising:

repeating the following until the ordering of all the code portions is specified, selecting an ordered pair of code portions such that is estimated based upon temporal usage patterns of the code portions of the ordered pair, to have the smallest effect on the performance of the computer program taking into considerations all other code portions whose ordering has been established relative to the selected ordered pair of code portions when the code portions of the selected ordered pair are positioned both in that order and contiguously in the program image; and establishing that the selected ordered pair of code portions are to be positioned both in the order and contiguously in the program image.

9. A method in a computer system for estimating the effect of a certain ordering of code portions on the performance of a computer program, the computer program having a plurality of code portions, the method comprising:

selecting a pair of code portions, each code portion of the pair having a temporal usage pattern indicating the time intervals during which the code portion is accessed; and based on the temporal usage patterns of the code portions of the pair, calculating the number of time intervals during which one code portion of the pair is accessed and during which the other code portion of the pair is not accessed.

10. A computer system for establishing a program image layout of a computer program, the computer program having basic blocks, each basic block having a usage pattern, the computer system comprising:

an initialization component that initializes a cluster for each of the basic blocks to contain that basic block; and a clustering component that repeats the following until an ordering of all the basic blocks is established, for a plurality of ordered pair of clusters, determining a metric value for the ordered pair of clusters, the metric value being derived from the usage patterns of the basic blocks of the cluster and estimating an effect on the performance of the computer program when that ordered pair of clusters are positioned in the program image in that order;

selecting the ordered pair whose metric value estimates the smallest effect on the performance of the computer program; and replacing the clusters of the selected ordered pair of clusters with a new cluster that includes the basic blocks of the selected ordered pair.

11. The computer system of claim 10 wherein the usage pattern is a temporal usage vector indicating time intervals during which the basic block was accessed during an execution of the computer program and wherein the determining of a metric value includes calculating the number of time intervals during which a basic block of one cluster of the ordered pair is accessed and during which no basic block of the other cluster of the ordered pair is accessed.

12. The computer system of claim 10 wherein the usage pattern is a temporal usage vector indicating time intervals during which the basic block was accessed during an execution of the computer program, wherein each basic block has a size, and wherein the determining of a metric value includes, for each time interval, summing the sizes of the basic blocks of the clusters of the pair which are not accessed during the time interval and for which a basic block of the other cluster that is on the same page is accessed.

13. The computer system of claim 12 wherein the metric value is the total of the sum of the sizes for each time interval.

14. The computer system of claim 10 wherein the clusters of a pair are assumed to be located contiguously in the middle of a page.

15. The computer system of claim 10 wherein the determining includes storing the metric values in a matrix so that those metric values not effected by the new cluster are not recalculated.

16. The computer system of claim 10 including determining an ordering metric for each cluster and, for each possible pair of clusters, setting a maximum possible metric value for the ordering of the pair of clusters for which the cluster with the lower ordering metric precedes the cluster with the higher ordering metric value.

17. A computer-readable medium containing instructions for causing a computer system to establish a layout of data objects of a computer program, each data object having a usage pattern, by:

repeating the following until the ordering of all the data objects is specified, selecting an ordered pair of data objects that is estimated, based upon temporal patterns of the code portions of the ordered pair, to have the smallest effect on the performance of the computer program taking into considerations all other data objects whose ordering has been established relative to the selected ordered pair of data object when the data objects of the selected ordered pair are positioned both in that order and contiguously in the program image the effect on the performance derived from the usage pattern of the data objects; and establishing that the selected ordered pair of data objects are to be positioned both in the order and contiguously in the computer program layout.

18. The computer-readable medium of claim 17 wherein the usage pattern is indicated by a temporal usage vector indicating time intervals during which the data object is accessed during an execution of the computer program and wherein the estimating of the effect on performance includes calculating the number of time intervals during which one of the selected data objects is accessed and during which the other one of the selected data objects is not accessed.

19. A computer-readable medium containing instructions for causing a computer system to estimate the effect of a certain ordering of data objects on the performance of a computer program, the computer program having a plurality of data objects, by:

selecting a pair of data objects, each data object of the pair having a temporal usage pattern indicating the time intervals during which the data object is accessed; and based on the temporal usage patterns of the code portions of the pair, calculating the number of time intervals during which one data object of the pair is accessed and during which the other data object of the pair is not accessed, wherein a higher calculated number of time intervals indicates an adverse effect on the performance of the computer system.

* * * * *